(No Model.)
P. WEBER.
BICYCLE.
No. 523,186. Patented July 17, 1894.
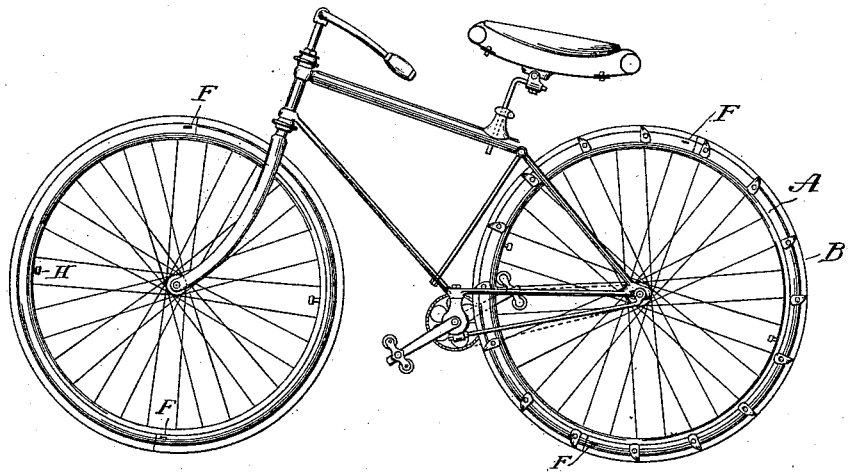
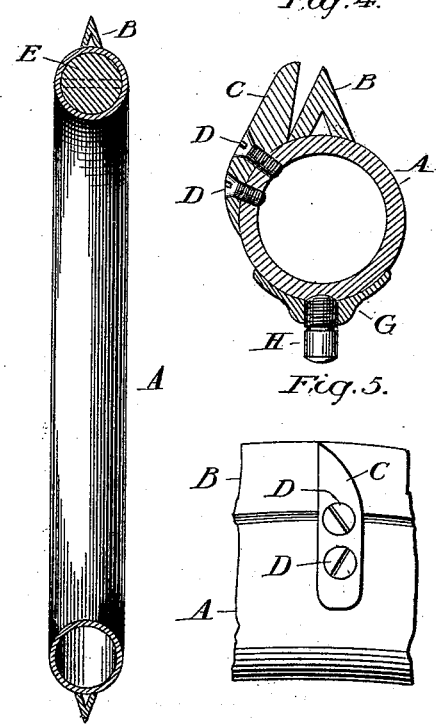
Witnesses:
Clara L. Roesch.
S. G. Hubbard.
Inventor
Peter Weber
By Emison Wheeler & Wheeler
Attorneys
THE NORRIS PETERS CO., PHOTO-LITHO., WASHINGTON, D. C.

UNITED STATES PATENT OFFICE.

PETER WEBER, OF MILWAUKEE, WISCONSIN.

BICYCLE.

SPECIFICATION forming part of Letters Patent No. 523,186, dated July 17, 1894.

Application filed February 3, 1894. Serial No. 499,043. (No model.)

*To all whom it may concern:*

Be it known that I, PETER WEBER, a citizen of the United States, residing at Milwaukee, in the county of Milwaukee and State of Wisconsin, have invented new and useful Improvements in Bicycles, of which the following is a specification.

My invention relates to improvements in bicycles.

The object of my invention is to provide a metallic substitute for the ordinary elastic bicycle tires for use on snow or ice.

In the drawings Figure I is a side view showing the tires in place. Fig. II is a perspective of a half section of my forward tire showing the sectional ends. Fig. III is a similar view of the rear tire. Fig. IV is a cross section of said rear tire drawn through one of the spurs. Fig. V is a detail side view showing one of the spurs. Fig. VI is a detail showing the coupling joint for uniting and adjusting the sections.

My tire is constructed of metal, steel being preferred.

The part A constitutes the body of the tire and consists of a hollow circular cylinder.

The part B is a V shaped flange, either hollow or solid, cast or riveted upon the outer circumference of the body A, and sharpened sufficiently to cut slightly into the ice.

C are spurs attached by means of the screws D D to the body A of the rear or drive wheel tire. They project outwardly near the flange B as far as the edge of said flange, and are adapted to catch in the ice and prevent slipping in the direction of the rotation of the wheel.

E is a joint tenon secured in place by the wedge shaped key F, which when driven to its seat, will draw the sections of the tire together and bind them securely upon the rim G.

H are set screws operating through the rim G upon the body A of the tire so as to prevent the tire from rotating upon the rim.

In the ordinary forms of bicycles and especially in the later pneumatic forms, the tire is held within the rim by virtue of its elasticity merely, a very little cement being used to prevent the rotation of the tire. This elastic tire can be easily rolled off and my invention substituted whenever it is desired to run upon an icy surface.

The spurs C are attached to the tire of the drive wheel only, their object being to enable the wheel to grip the ice and propel the bicycle. The flange B is used on both tires to prevent side slipping and is especially needed when turning.

If it is desired to avoid expense, the spurs may be dispensed with, or my tire can be used for the rear wheel only, but this course is not recommended.

What I claim as new, and desire to secure by Letters Patent, is—

1. In a bicycle, the combination of a forward or guide wheel with a rear or drive wheel, having a metallic tire consisting of a cylindrical body provided with a V shaped flange on its outer circumference, adapted to prevent side slipping, and a series of spurs attached to said body and adapted to catch and prevent slipping in the direction of rotation, substantially as specified.

2. In a bicycle, the combination of a forward or guide wheel having a metallic tire consisting of a cylindrical body provided with a V shaped flange upon its outer circumference, with a rear or drive wheel having a metallic tire, consisting of a cylindrical body provided with a V shaped flange upon its outer circumference, and a series of spurs attached to the body of the tire and adapted to catch and prevent slipping in the direction of rotation, substantially as specified.

In testimony whereof I affix my signature in the presence of two witnesses.

PETER WEBER.

Witnesses:
JAS. B. ERWIN,
CLARA L. ROESCH.